US007496383B2

(12) United States Patent
Kurata et al.

(10) Patent No.: US 7,496,383 B2
(45) Date of Patent: Feb. 24, 2009

(54) MOBILE COMMUNICATION SYSTEM AND BASE STATION CONTROL APPARATUS

(75) Inventors: Ryosuke Kurata, Yokohama (JP); Masaaki Yano, Yokohama (JP); Daiho Kasai, Fujisawa (JP); Kenji Yamazaki, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 584 days.

(21) Appl. No.: 11/342,884

(22) Filed: Jan. 31, 2006

(65) Prior Publication Data

US 2006/0189308 A1    Aug. 24, 2006

(30) Foreign Application Priority Data

Feb. 1, 2005    (JP) ............................. 2005-025270

(51) Int. Cl.
*H04M 1/00* (2006.01)
(52) U.S. Cl. ....................... 455/561; 455/442; 370/331
(58) Field of Classification Search ............. 455/422.1, 455/436, 442, 550.1, 561; 370/328, 329, 370/331
See application file for complete search history.

(56) References Cited

U.S. PATENT DOCUMENTS

| 5,960,349 | A  | * | 9/1999 | Chheda et al. | ............... | 455/446 |
| 6,188,914 | B1 | * | 2/2001 | Chheda | .................... | 455/562.1 |
| 6,393,302 | B1 | * | 5/2002 | O'Byrne | .................. | 455/562.1 |
| 6,778,833 | B1 | * | 8/2004 | Fortuna | ....................... | 455/446 |
| 7,050,812 | B2 | * | 5/2006 | Boyer et al. | ................ | 455/446 |
| 7,177,648 | B2 | * | 2/2007 | Attar et al. | ................ | 455/452.2 |
| 7,212,822 | B1 | * | 5/2007 | Vicharelli et al. | ........... | 455/450 |

FOREIGN PATENT DOCUMENTS

JP         2000-287256          10/2000

OTHER PUBLICATIONS

3GPP TR 25.832 v4.0.0 (Mar. 2001) (Release 4).
Connection Layer 3GPP2.C.S0024 Ver 3.0 pp. 6-121-127.

* cited by examiner

*Primary Examiner*—Nhan T Le
(74) *Attorney, Agent, or Firm*—Mattingly, Stanger, Malur & Brundidge, P.C.

(57) ABSTRACT

A neighbor sector is automatically set to effectively perform soft handover. A base station corresponding to a first sector to communicate with a wireless terminal and a base station corresponding to a second sector to start communication with the wireless terminal due to movement of the wireless terminal or the like transmit a terminal identifier acquired from the wireless terminal, a time and a sector identifier to a base station control part (control part in the following). The control part successively stores the received sector identifier into a table correspondingly to the terminal identifier and the time received from the base station. Besides, the control part refers to the table, judges whether different sector identifiers are stored in a previously determined time range, regards a pair of the two different sector identifiers as neighbor sector candidates and counts the number of times they are regarded as the neighbor sector candidates. With respect to the neighbor sector candidates in which the counted number of times is a threshold or more, the control part transmits, to the base station corresponding to one sector of the neighbor sector candidates, a change request including the neighbor sector information concerning the other sector.

11 Claims, 15 Drawing Sheets

(TERMINAL CONNECTION HISTORY TABLE)

| TIME | TERMINAL 1 | TERMINAL 2 | TERMINAL 3 | TERMINAL 4 |
|---|---|---|---|---|
| 13:00 | SECTOR 1 | | | |
| 13:01 | SECTOR 1 | | | |
| 13:02 | SECTOR 1 | | | |
| 13:03 | SECTOR 1 | SECTOR 1 | | |
| 13:04 | SECTOR 1 | SECTOR 1 | | |
| 13:05 | SECTOR 1 | SECTOR 1 | SECTOR 1 | |
| 13:06 | SECTOR 2 | SECTOR 1 | SECTOR 1 | |
| 13:07 | SECTOR 2 | SECTOR 1 | SECTOR 1 | |
| 13:08 | SECTOR 2 | SECTOR 1 | SECTOR 2 | |
| 13:09 | SECTOR 2 | | | |
| 13:10 | SECTOR 2 | | | |
| 13:11 | SECTOR 2 | | | |
| ... | ... | ... | ... | ... |

SECTOR DATABASE 201-4

| No. | NODE NAME | SECTOR | PILOT SIGNAL | FREQUENCY CHANNEL |
|---|---|---|---|---|
| 1 | NODE 1 | SECTOR 1 | A | 1120ch |
| 2 | NODE 1 | SECTOR 2 | B | 1100ch |
| 3 | NODE 1 | SECTOR 3 | C | 1130ch |
| 4 | NODE 2 | SECTOR 4 | D | 1150ch |
| 5 | NODE 2 | SECTOR 5 | E | 1100ch |
| ... | ... | ... | | |

FIG.5

NEIGHBOR SECTOR TABLE (SECTOR 1)   201-3

| No. | NEIGHBOR SECTOR | PILOT SIGNAL |
|---|---|---|
| 1 | SECTOR 2 | B |
| 2 | — | |
| 3 | — | |
| 4 | — | |
| 5 | — | |
| ... | ... | |

FIG.7

(PERIPHERAL RADIO WAVE INFORMATION TABLE)   201-6

| TIME | CALL 1 | | CALL 2 | | CALL 3 | |
|---|---|---|---|---|---|---|
| | CAPTURED RADIO WAVE | SECTOR | CAPTURED RADIO WAVE | SECTOR | CAPTURED RADIO WAVE | SECTOR |
| 13:00 | — | — | — | — | — | — |
| 13:01 | A, B | 1, 2 | — | — | — | — |
| 13:02 | A, B | 1, 2 | — | — | A, B, C | 1, 2, 3 |
| 13:03 | A, B | 1, 2 | A | 1 | A, B, C | 1, 2, 3 |
| 13:04 | A, B, C | 1, 2, 3 | A | 1 | A, B | 1, 2 |
| 13:05 | A, B, C | 1, 2, 3 | A | 1 | A, B | 1, 2 |
| 13:06 | A, B | 1, 2 | A, B | 1, 2 | A, B | 1, 2 |
| 13:07 | A, B | 1, 2 | A, B | 1, 2 | — | — |
| 13:08 | A, B | 1, 2 | A | 1 | — | — |
| 13:09 | A | 1 | A | 1 | — | — |
| 13:10 | — | — | A | 1 | — | — |
| 13:11 | — | — | — | — | — | — |
| | ... | ... | ... | ... | ... | ... |

FIG.13

MOBILE COMMUNICATION SYSTEM AND BASE STATION CONTROL APPARATUS

BACKGROUND OF THE INVENTION

The present invention relates to a mobile communication system and a wireless base station control apparatus, and particularly to a mobile communication system and a wireless base station control apparatus for managing an adjacent relation of wireless base stations in a mobile communication system where plural wireless terminals simultaneously communicate with one sector and one wireless terminal can receive signals of plural sectors and/or in a mobile communication system where communication is performed by the code division multiple access (CDMA) system in each sector of each base station.

The basis of cellular communication is that a wireless terminal, such as, for example, an in-vehicle telephone or a cellular phone, finds a radio wave from a sector of a nearby base station and exchanges a radio wave between the wireless terminal and the base station. A communicable area in which a radio wave from one of antennas provided in a base station can reach is called a "sectors". The base station includes one or plural sectors. The cellular communication service area is constructed by arranging the sectors without a gap. A multi-sector structure in which base stations are installed at intervals of a specific distance is adopted, and plural sectors provided by the respective base stations are disposed continuously (so as not to become thin), so that the wireless terminal can communicate from anywhere, and a wide service area is constructed.

Besides, in the CDMA communication network, a soft handover technique is known in which when a wireless terminal changes a base station with which communication is made, a composition of signals by communication with plural base stations or selection of a communication channel is performed, and the communication channel is changed without instantaneous interruption (for example, see "3G TR25.832 V4.0.0", published by 3GPP, March 2001, Chapter 5.2.1). In order to perform this soft handover, it is necessary for a wireless terminal to previously receive a control signal from a sector of a base station (adjacent base station) adjacent thereto. In order to bring the soft handover into an operable state, the wireless terminal searches a radio wave of a different sector by sequentially using an offset value other than a pilot signal offset value used in the sector under communication, and attempts to capture the radio wave from the different sector.

On the other hand, the base station manages control information of the sector and periodically transmits (broadcasts) the control information. This broadcast message includes radio wave information of a peripheral sector called neighbor sector information (see, for example, "3GPP2: C. S0024", published by 3GPP2, October 2002). The wireless terminal can efficiently capture the radio wave of the peripheral sector based on the neighbor sector information. By this, it becomes possible to effectively perform the soft handover.

For example, in the case where the "neighbor sector information" is set in the control information received from the sector under communication, the radio terminal attempts to capture the radio wave in accordance with a frequency and a pilot signal offset indicated in the "neighbor sector information", so that it becomes possible to efficiently capture the radio wave from the neighbor sector. Besides, the wireless terminal simultaneously captures radio waves from plural base stations, compares reception qualities, and performs the handoff to one with a higher quality.

In the cdma system, in order to effectively perform the soft handover and to provide a high quality cellular communication service, it is appropriate that a neighbor sector is correctly determined in each sector, information of the determined neighbor sector is set and registered as management information of the base station, and a state is produced in which a broadcast message transmits the correct neighbor sector information. Besides, in the cellular communication system, also after the service is started, in order to eliminate a shadow area and to deal with an increase in traffic, the rearrangement of wireless base stations and the additional installation of a base station are frequently performed.

When the addition and change of base stations as stated above is performed, there is a case where the adjacent relation of the base stations is changed. In order that the wireless terminal efficiently continues the soft handover also after the adjacent base station is changed, the adjacent relation after the change is correctly grasped, and if necessary, it is necessary to change the notification (broadcast) message from the base station.

Besides, even in the case where there is no change in the arrangement of base stations, there is a case where a transmission environment is changed by the change of an environment around the base station due to the construction of a building or the like. For example, there is also a case where the soft handover to a certain neighbor sector becomes impossible by the change of the transmission environment. In such a case, for example, the information of the sector must be deleted from the broadcast message.

As a method of specifying sectors having an adjacent relation, it is conceivable to calculate the adjacent relation based on a distance between the base stations. However, even in sectors of base stations close to each other in distance, there is a case where the radio wave from the nearby sector does not reach by the influence of geographic features or a building, or there is a case where the radio wave is actually limited in a closed space as in an underground market or a base station installed in a building, and there is a case where the soft handover can not be performed. Thus, in order to strictly determine the adjacent relation of sectors, it becomes necessary to grasp the radio wave environment by a traveling test using a radio wave measuring vehicle, a transmission simulation or the like. However, it takes long time and high cost to measure the radio wave. Further, the measurement is required each time a base station is added or the arrangement is changed. Besides, the simulation also requires both time and cost, and since an actual environment can not be completely reproduced, a correct result is not necessarily obtained.

SUMMARY OF THE INVENTION

It is an object of the invention to provide a mobile communication system and a wireless base station control apparatus, in which in a mobile communication network, a wireless terminal can effectively perform soft handover between sectors of respective base stations. Besides, the invention has an object to cause soft handover of a wireless terminal to be effectively performed by automatically collecting and setting neighbor sector information even in the case where the neighbor sector information is not registered. Further, the invention has an object to provide a mobile communication system in which when a base station is additionally installed, is removed or is moved, or a transmission environment is changed, radio wave measurement, simulation, setting operation and the like can be omitted, so that the operation cost can be reduced.

Besides, the invention has an object to automatically update a broadcast message to cause soft handover to be effectively performed without performing a maintenance action, such as a simulation, radio wave measurement or change of a base station parameter, for determining an adjacent relation of base stations when the arrangement of the base stations is changed, the radio wave environment is changed by the change of a peripheral environment and a base station is newly installed.

In the CDMA communication network, the soft handover technique is known in which the combination of signals by communication with plural sectors or the selection of a communication channel is performed, and when a base station is changed, the communication channel is changed without instantaneous interruption. However, in the case where a wireless terminal is moved into a sector of an adjacent base station while the wireless terminal is in a state where it can not receive radio waves of plural sectors, the handover is accompanied by an instantaneous interruption or a short suspension period.

(1) In the invention, for example, a base station control part to store a communication history for each wireless terminal is provided in a mobile communication network. The communication history for each wireless terminal is tracked, and two sectors in which communication occurs continuously are regarded as neighbor sector candidates. At a stage where the number of times certain sectors have become neighbor sector candidates exceeds a specific number of times, they are determined to be the neighbor sectors and are reflected in a broadcast message.

(2) As a different method from this, attention is paid to notification information regulated in the CDMA communication network and sent to a base station from a wireless terminal, and when the terminal can catch signals from plural sectors, the sectors are regarded as neighbor sector candidates. At a stage where the number of times certain sectors become the neighbor sector candidates exceeds a specific number of times, they are determined to be the neighbor sectors and are reflected in a broadcast message.

The content of the broadcast message of the sector is automatically updated by the above means. By this, the soft handover between the sectors can be subsequently performed more effectively.

According to first solving means, a mobile communication system includes one or plural base stations each of which has one or plural sectors and transmits, for each sector, neighbor sector information including a sector identifier of another sector adjacent to the sector and/or information to identify a radio wave from the another sector, to a wireless terminal for each sector, and a base station control part which includes a connection history table storing, for each terminal identifier of the wireless terminal and correspondingly to a time, a sector identifier of a sector with which the wireless terminal communicates, and is for changing the neighbor sector information transmitted from the base station, the base station transmits the terminal identifier acquired from the wireless terminal and the sector identifier of the sector communicating with the wireless terminal to the base station control part, the base station control part receives the terminal identifier and the sector identifier, and stores the sector identifier into the connection history table correspondingly to the terminal identifier and a reception time, the base station control part refers to the connection history table, judges that in a case where plural different sector identifiers are stored correspondingly to each terminal identifier in a previously determined time period from an arbitrary time, a first sector and a second sector among the plural different sector identifiers are neighbor sector candidates, and counts the number of times they are judged to be the neighbor sector candidates correspondingly to a first sector identifier of the first sector and a second sector identifier of the second sector, and the base station control part transmits, with respect to the first and the second sector identifiers in which the counted number of times is a previously determined threshold or more, a change request, which includes the second sector identifier and/or information to identify a radio wave from the second sector and is for changing the neighbor sector information from the base station, to the base station corresponding to the first identifier.

According to second solving means of the invention, a mobile communication system includes one or plural base stations each of which has one or plural sectors and transmits, for each sector, neighbor sector information including a sector identifier of another sector adjacent to the sector and/or information to identify a radio wave from the another sector, and a base station control part to change the neighbor sector information transmitted from the base station, the base station acquires, from a wireless terminal, one or plural pieces of captured radio wave information indicating radio waves captured from one or plural sectors by the wireless terminal and transmits the captured radio wave information to the base station control part, the base station control part receives the captured radio wave information from the base station, judges whether plural pieces of captured radio wave information are received, judges that a first sector and a second sector are neighbor sector candidates among plural sector identifiers corresponding to the plural pieces of captured radio wave information, counts the number of times they are judged to be the neighbor sector candidates correspondingly to a first sector identifier of the first sector and a second sector identifier of the second sector, and the base station control part transmits, with respect to the first and the second sector identifiers in which the counted number of times is a previously determined threshold or more, a change request, which includes the second sector identifier and/or information to identify a radio wave from the second sector and is for changing the neighbor sector information from the base station, to the base station corresponding to the first identifier.

According to third solving means of the invention, a wireless base station control apparatus includes an interface to transmit/receive information to/from a base station having one or plural sectors, a connection history table in which for each terminal identifier of a wireless terminal and correspondingly to a time, a sector identifier of a sector with which the wireless terminal communicates is stored, and a processing part to change neighbor sector information which is transmitted from the base station having one or plural sectors to the wireless terminal and includes, for each sector, a sector identifier of another sector adjacent to the sector and/or information to identify a radio wave from the another sector, the processing part receives, from the base station, a terminal identifier from the wireless terminal and a sector identifier of a sector communicating with the wireless terminal, the processing part stores the sector identifier into the connection history table correspondingly to the terminal identifier and a reception time, the processing part refers to the connection history table, and judges that in a case where plural different sector identifiers are stored correspondingly to each terminal identifier in a previously determined time period from an arbitrary time, a first sector and a second sector among the plural different sector identifiers are neighbor sector candidates, and counts the number of times they are judged to be the neighbor sector candidates correspondingly to a first sector identifier of the first sector and a second sector identifier of the second sector, and the processing part transmits, with respect to the first and the second sector identifiers in which the counted number of times is a previously determined threshold or more, a change request, which includes the second sector identifier and/or information to identify a radio wave from the second sector and is for changing the neighbor sector information from the base station, to the base station corresponding to the first identifier.

According to fourth solving means of the invention, a wireless base station control apparatus includes an interface to transmit/receive information to/from a base station having one or plural sectors, and a processing part to change neighbor sector information which is transmitted from the base station to a wireless terminal and includes, for each sector, a sector identifier of another sector adjacent to the sector and/or information to identify a radio wave from the another sector, the processing part receives, from the base station, one or plural pieces of captured radio wave information indicating a radio wave captured by the wireless terminal from one or plural sectors, judges whether plural pieces of captured radio wave information are received, judges that a first sector and a second sector among plural sector identifiers corresponding to the plural pieces of captured radio wave information are neighbor sector candidates, and counts the number of times they are judged to be the neighbor sector candidates correspondingly to a first sector identifier of the first sector and a second sector identifier of the second sector, and the processing part transmits, with respect to the first and the second sector identifiers in which the counted number of times is a previously determined threshold or more, a change request, which includes the second sector identifier and/or information to identify a radio wave from the second sector and is for changing neighbor sector information from the base station, to the base station corresponding to the first sector identifier.

BRIEF DESCRIPTION OF THE DRAWINGS

FIG. 4 is an explanatory view of a terminal connection history table.

FIG. 5 is an explanatory view for explaining a state of a sector database.

FIG. 7 is an explanatory view of a neighbor sector table of a sector 1.

FIG. 13 is an explanatory view of a peripheral radio wave information table.

DESCRIPTION OF THE PREFERRED EMBODIMENTS

1. First Embodiment

Hereinafter, a structure of a wireless base station and a mobile communication network in this embodiment will be described with reference to the drawings.

(Hard Structure)

Figure 1:
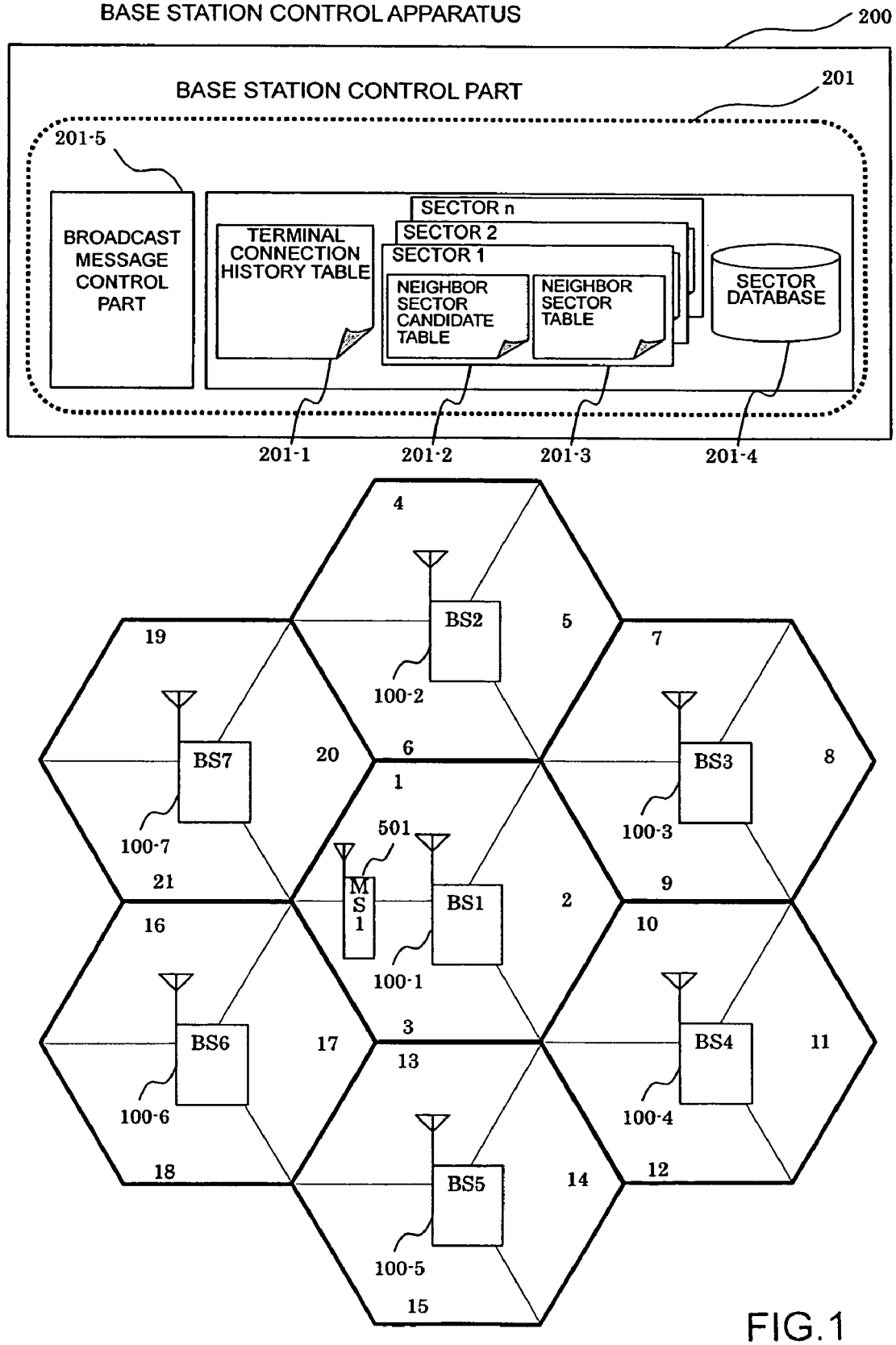
FIG. 1 is a block diagram showing a structure of a mobile communication network in a first embodiment.

FIG. 1 is a block diagram showing a structural example of a mobile communication system to which this embodiment is applied. This mobile communication system includes plural wireless base stations BS (100-1 to 100-7), plural wireless terminals MS (501) and a base station control apparatus (200) to control the wireless base stations (100).

Each of the wireless base station (100) includes one or plural sectors (1 to 21) as mobile communication areas. Incidentally, an operation according to this embodiment can be applied irrespective of the number of sectors of the base station (100).

The base station control apparatus (200) includes a base station control part (201) operated by a previously stored program. The base station control part (201) includes a terminal connection history table (201-1), a sector database (201-4), and a broadcast message control part (201-5). The base station control part (201) further includes a neighbor sector candidate table (201-2) and a neighbor sector table (201-3) for each sector. The terminal connection history table (201-1) stores a connection history (communication history) of each wireless terminal. Besides, the sector database (201-4) stores detailed information of all sectors of management objects. The broadcast message control part (201-5) has a function to control the radio wave transmitted by the wireless base station (100).

Incidentally, it does not matter that the base station control part (201) exists in which housing of the base station (100) or the mobile communication network. FIG. 1 shows an example in which the base station control part (201) is contained in the housing of the dedicated base station control apparatus (200).

Figure 2:
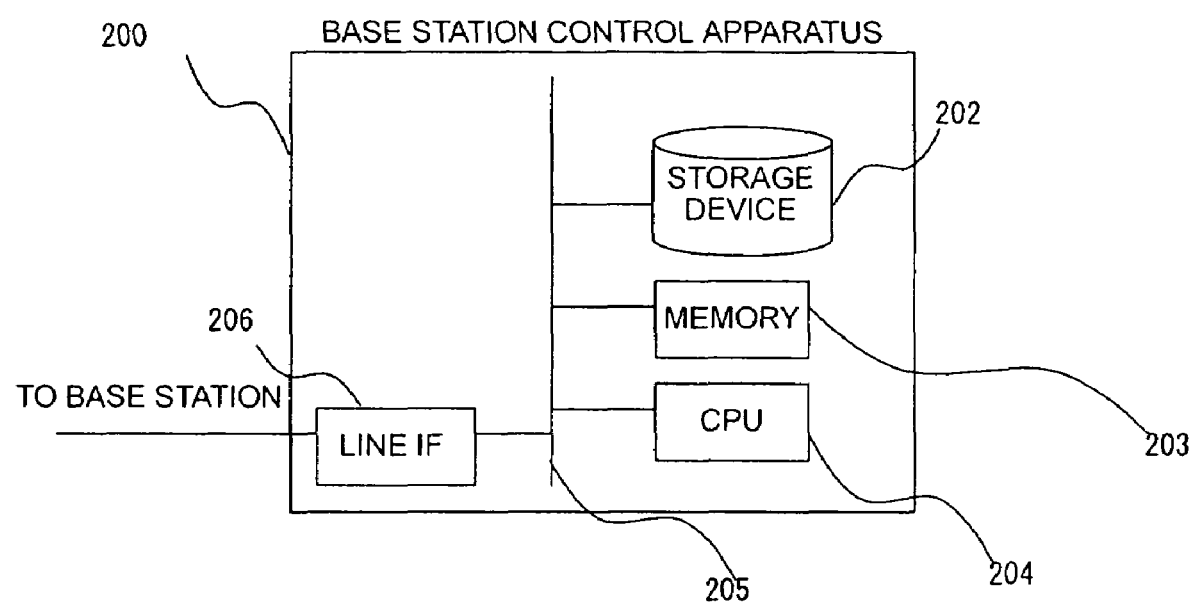
FIG. 2 is a block diagram showing a structural example of a base station control apparatus.

FIG. 2 is a block diagram showing a structural example of the base station control apparatus (200).

The base station control apparatus (200) includes a storage device (202), a memory (203), a CPU (204) and a line IF (206). The CPU (204) uses a control program stored in the memory (203) and various data (for example, the tables 201-1 to 201-4) stored in the storage device (202), and controls the whole of the base station control part (201) and the wireless base stations (100-1 to 100-7) connected to the base station control part (201). The foregoing units and the like are connected through an internal bus (205), and the control to the wireless base station (100) is performed through the line interface (206). Incidentally, the terminal connection history table (201-1), the neighbor sector candidate table (201-2), the neighbor sector table, the sector database (201-4) and the like can be stored in the storage device (202) or the memory (203) of FIG. 2. Besides, the broadcast message control part (201-5) can be executed by the CPU (204) of FIG. 2.

Figure 3:
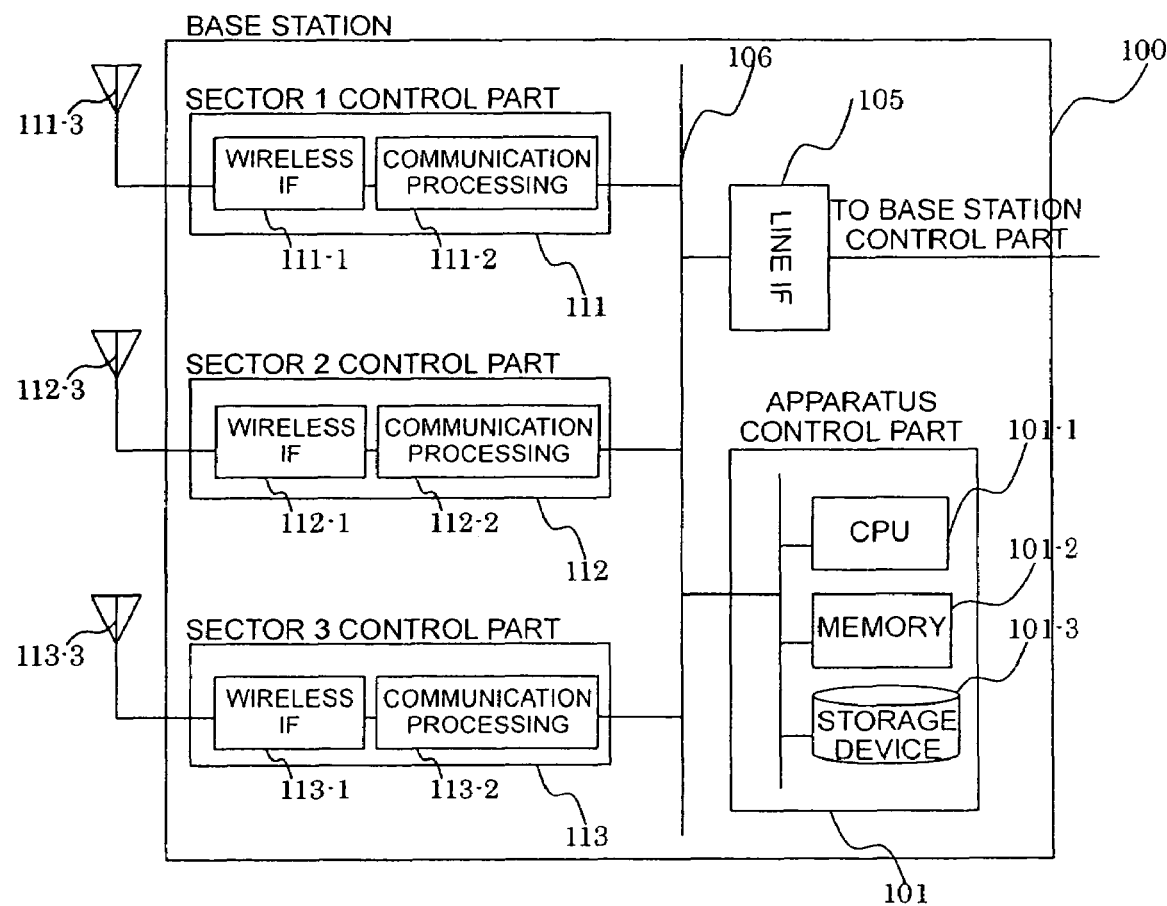
FIG. 3 is a block diagram showing a structural example of a base station.

FIG. 3 is a block diagram showing a structural example of the wireless base station (100). The wireless base station (100) includes an apparatus control part (101) to control the whole wireless base station, sector control parts (111 to 113) of the respective sectors, antennas (111-3 to 113-3) corresponding to the respective sectors, and a line interface (105). Besides, the apparatus control part (101) includes a CPU (101-1), a memory (101-2) and a storage device (101-3). Each of the control parts (111 to 113) of the respective sectors includes a wireless IF (111-1) and a communication processing part (111-2).

The CPU (101-1) of the apparatus control part (101) uses a control program stored in the memory (101-2) and various data (for example, information of terminals, etc.) stored in the storage device (101-3), and controls the whole base station (100). Each of the sector control parts (111 to 113) performs transmission of a control message to be transmitted from the sector and reception processing of various control messages from a terminal. These units and the like are connected through an internal bus (106), and communication with the base station control part (201) is performed through the line interface (105).

(Table Structure)

FIG. 4 is a format view of the terminal connection history table (201-1).

The terminal connection history table (201-1) stores, for each terminal identifier and correspondingly to a time, identifying information of a sector to which the terminal is connected at the time. The example of FIG. 4 indicates that a terminal 1 is connected to a sector 1 from 13:00 to 13:05 and is connected to a sector 2 after 13:06. Besides, a terminal 2 is connected to the sector 1 at 13:03 and is disconnected after being connected till 13:08. Incidentally, the time, the terminal identifier and the identifying information of the sector can be periodically notified to the base station control part (201) from the base station (each sector). In the example of FIG. 4, although the identifying information of the sector is stored every minute, the invention is not limited to this, and it may be stored every suitable time. Besides, the invention is not limited to the structure shown in FIG. 4, and the structure may be suitably simplified or complicated.

FIG. 5 is a format view of the sector database (201-4).

In the sector database (201-4), a node name, identifying information of a sector, pilot signal information and frequency channel information are made to correspond to each other and are stored. The node name is, for example, identifying information corresponding to the base station (100). For example, node 1 corresponds to the base station BS1 (100-1) of FIG. 1, and node 2 corresponds to the base station (100-2) of FIG. 1. In the pilot signal information and the frequency channel information, information concerning a pilot signal and a frequency channel used in the relevant node and sector are previously stored. Besides, the sector database (201-4) may be added with suitable data numbers as shown in the drawing.

Figure 6:
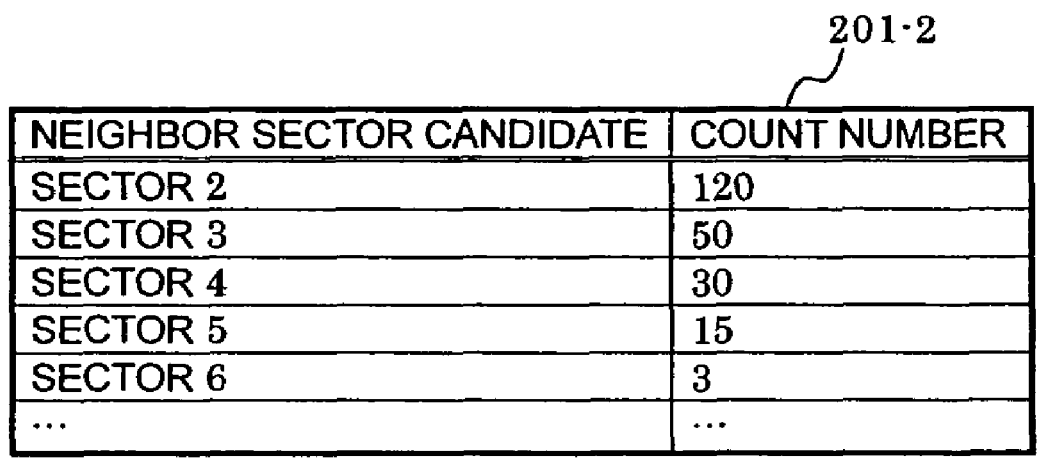
FIG. 6 is an explanatory view of a neighbor sector candidate table.

FIG. 6 is a format view of the neighbor sector candidate table (201-2). In the neighbor sector candidate table (201-2), a count number corresponding to a neighbor sector candidate is stored for each sector. Incidentally, although FIG. 6 shows an example of the table concerning the sector 1, also with respect to the other sectors such as the sector 2, the same structure can be adopted. For example, when it is judged that the sector 1 and the sector 2 are neighbor sector candidates, in the adjacent candidate table concerning sector 1 shown in FIG. 6, the count number corresponding to the sector 2 is counted up. Besides, in the adjacent candidate table concerning the sector 2, the count number corresponding to the sector 1 is counted up. When the count number exceeds a previously determined value, the corresponding neighbor sector candidate is determined to be the "neighbor sector".

FIG. 7 is a format view of the neighbor sector table. In the neighbor sector table, with respect to each sector, a neighbor sector and neighbor sector information such as pilot signal information are made to correspond to each other and are stored. Although FIG. 7 shows an example of the table concerning the sector 1, also with respect to the other sectors such as the sector 2, the same structure can be adopted. Besides, the neighbor sector table may include a suitable data number and frequency channel information.

The wireless base station (100) to perform the cdma communication and the mobile communication network are constructed as stated above. At the stage where the network is constructed, the neighbor sector information of each sector may not be registered.

(Operation)

Hereinafter, a description will be given to an example of an operation in which a neighbor sector is automatically determined by the movement of a terminal.

Figure 8:
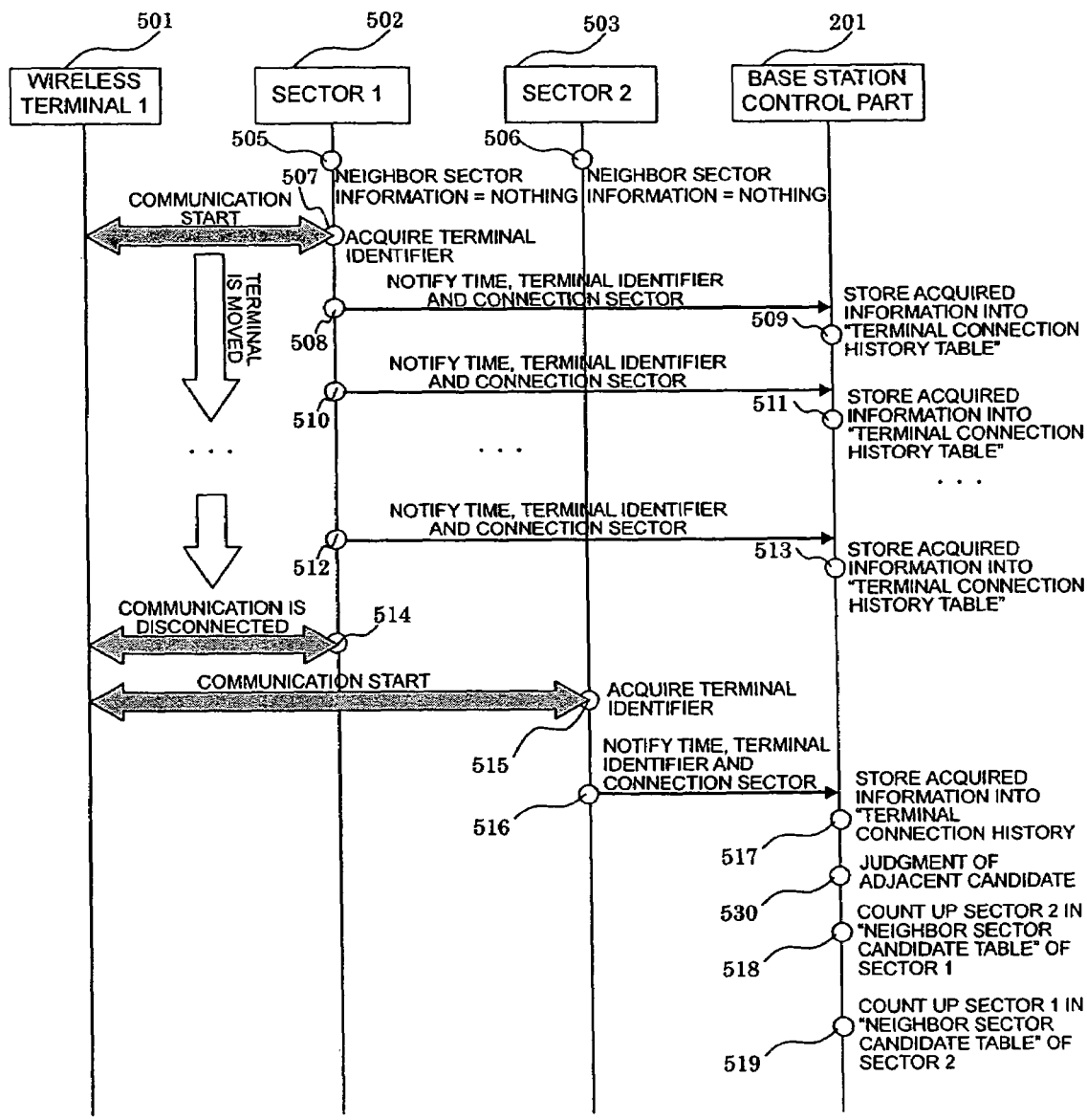
FIG. 8 is an operation explanatory view for explaining an example of an operation to find a candidate of a neighbor sector when a wireless terminal is moved in the first embodiment.

FIG. 8 shows an operation sequence at the time when the wireless terminal (501) communicating with the sector 1 (502) moves to the sector 2 (503). At this time, neighbor sector information is not set in a broadcast message from each sector to the terminal (505 and 506). In this state, unless the terminal (501) itself can receive a radio wave of the peripheral base station (100) by searching a pilot signal of the peripheral base station (100), the soft handover can not be performed. Incidentally, in addition to the case of the movement of the terminal (501), the same applies to a case where a sector with which the terminal communicates is changed by a change in radio wave environment, or the like.

First, the wireless terminal (501) starts to communicate with one (for example, the sector 1 (502)) of sectors of the base station (100). The wireless terminal (501) in which the terminal identifier is previously stored in the suitable memory notifies the terminal identifier at the time of connection and periodically to the base station (100) containing the sector of the communication partner (processing 507). The base station (for example, the base station control part (201)) periodically acquires the terminal identifier transmitted from the terminal (501) through the antenna corresponding to the sector communicating with the terminal (501) and the sector control part (111). When acquiring the terminal identifier or periodically, the base station (100) notifies the acquired terminal identifier, the time and the connection sector (for example, the identifying information of the connection sector) to the base station control part (201) (processing 508, 510 and 512). The identifying information of the sector having acquired the terminal identifier or the identifying information of the sector communicating with the terminal can be used as the information of the connection sector. Besides, the identifying information of the sector can be previously stored in a suitable memory. With respect to the time, a suitable clock in the inside of the base station (100) can be used.

The base station control part (201) (for example, the CPU (204)) writes the notified time, terminal identifier and connection sector into the terminal connection history table (201-1) (processing 509, 511 and 513). For example, the base station control part (201) writes the connection sector into the field of the terminal connection history table (201-1) corresponding to the notified time and the terminal identifier. Incidentally, the notification of the time is omitted, and for example, the time when the base station control part (201) receives the terminal identifier and the connection sector from the terminal (501) may be used.

When the terminal (501) moves to the sector 2, and the radio wave reception quality of the sector under communication is degraded, the communication is once interrupted (processing 514). The terminal (501) searches a radio wave of another base station (100) or sector, and when succeeded, reconnection is performed by the searched radio wave (processing 515). For example, here, it is assumed that the terminal (501) is reconnected to the sector 2 (503). At the time of connection and periodically, the terminal (501) notifies the terminal identifier to the base station (100) containing the sector 2 of the communication partner (processing 515). The sector 2 (503) of the reconnected base station (100) periodically notifies the terminal identifier acquired from the terminal (500), the time and the information of the connection sector to the base station control part (201) (processing 516). The base station control part (201) writes the notified time, terminal identifier, and connection sector into the terminal connection history table (201-1) similarly to the above. (processing 517).

The base station control part (201) refers to the terminal connection history table (201-1) and judges the neighbor sector candidate (processing 530). For example, the base station control part (201) refers to the terminal connection history table (201-1), and with respect to the terminal having the same terminal identifier, in the case where communication is made with different sectors at two continuous times (periods), it is judged that these two sectors are "neighbor sector candidates". For example, in the example of the "terminal connection history table (201-1)" shown in FIG. 4, the "terminal 1" having identifier number 1 is connected to the sector 1 at 13:00, and is once disconnected at 13:05, and then is connected to the sector 2 at 13:0. Since the terminal 1 is connected to the sector 1 and the sector 2 at the continuous times of 13:05 and 13:06, it is judged that the sector 1 and the sector 2 are the "neighbor sector candidates". Incidentally, it is not always necessary that the time is continuous, and when two different sector identifiers are stored in a previously determined time range, it may be judged that they are "neighbor sector candidates". Incidentally, the base station control part (201) may perform processing 530 every previously determined period, or may execute the processing when the terminal identifier is received from the sector.

Besides, with respect to each sector of the sector pair (here, the sector 1 and the sector 2) judged to be the "neighbor sector candidates", the base station control part (201) counts the number of times it becomes the candidate in the candidate table (201-2) (processing 518, 519). For example, the base station control part (201) counts up the number of times corresponding to the sector 2 in the neighbor sector candidate table (201-2) of the sector 1 (processing 518). Besides, the base station control part (201) counts up the number of times corresponds to the sector 1 in the neighbor sector candidate table (201-2) of the sector 2 (processing 519).

Figure 9:
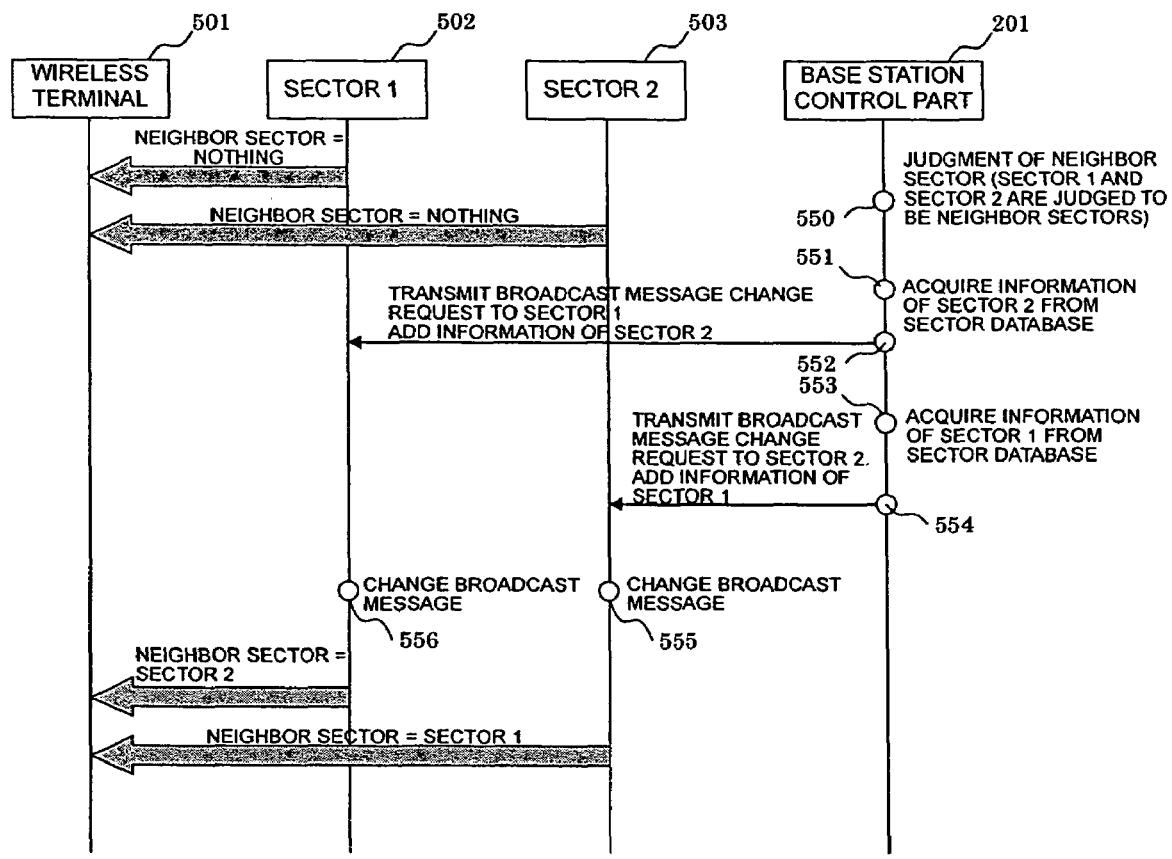
FIG. 9 is an operation explanatory view for explaining an example of the content of a control. which is performed by a base station control part after a neighbor sector is determined.

FIG. 9 is a sequence view showing an operation of neighbor sector determination.

The base station control part (201) determines that a sector in which the number of times it becomes a "neighbor sector candidate" with respect to a certain sector reaches a previously set number of times is a "neighbor sector" (processing 550). For example, the base station control part (201) refers to the count number in the neighbor sector candidate table (201-2) of each sector, and determines that a neighbor sector candidate in which the count number is a previously set number of times or more is a "neighbor sector" of the sector. The base station control part (201) acquires, for example, the sector data of the sector determined to be the neighbor sector from the sector database (201-4) (processing 551). For example, the base station control part (201) refers to the sector database (201-4) based on the sector identifier of the neighbor sector determined at processing 550, and acquires parameter values intrinsic to each sector and necessary for setting, such as a corresponding pilot signal. Besides, the base station control part (201) stores the acquired pilot signal into the neighbor sector table (201-3) of the relevant sector correspondingly to the determined neighbor sector. Further, the corresponding frequency channel information is acquired from the sector database (201-4) and may be stored in the neighbor sector table (201-3).

Next, the base station control part (201) performs a change control of a broadcast message to the base station (100) containing the sector (processing 552). For example, the base station control part (201) transmits a broadcast message change request including neighbor sector information concerning the determined neighbor sector to the base station (100) containing the sector. The neighbor sector information includes, for example, one or plural of the identifying information of the sector 2, the pilot signal information, the frequency channel information and the like. For example, at processing 552, the base station control part (201) can transmit the change request including the neighbor sector information stored in the neighbor sector table (201-3) of the sector 1 to the base station (100) corresponding to the sector 1.

Besides, also with respect to the sector 2, the same processing is performed. For example, first, the base station control part (201) acquires sector data including the pilot signal of the sector 1 from the sector database (201-4) (processing 553). Besides, the base station control part (201) stores the acquired pilot signal into the neighbor sector table (201-3) of the sector correspondingly to the sector identifier of the determined neighbor sector. The base station control part (201) performs a change control of a broadcast message to the base station (100) containing the sector. For example, at processing 554, the base station control part (201) transmits the change request including the neighbor sector information of the sector 1 to the base station (100) corresponding to the sector 2.

The base station (100) updates, with respect to each sector, the "neighbor sector information" in the broadcast message in accordance with the change request from the base station control part (201) (processing 555 and 556). Subsequently, the base station (100) transmits the broadcast message based on the new information of the neighbor sector.

Figure 10:
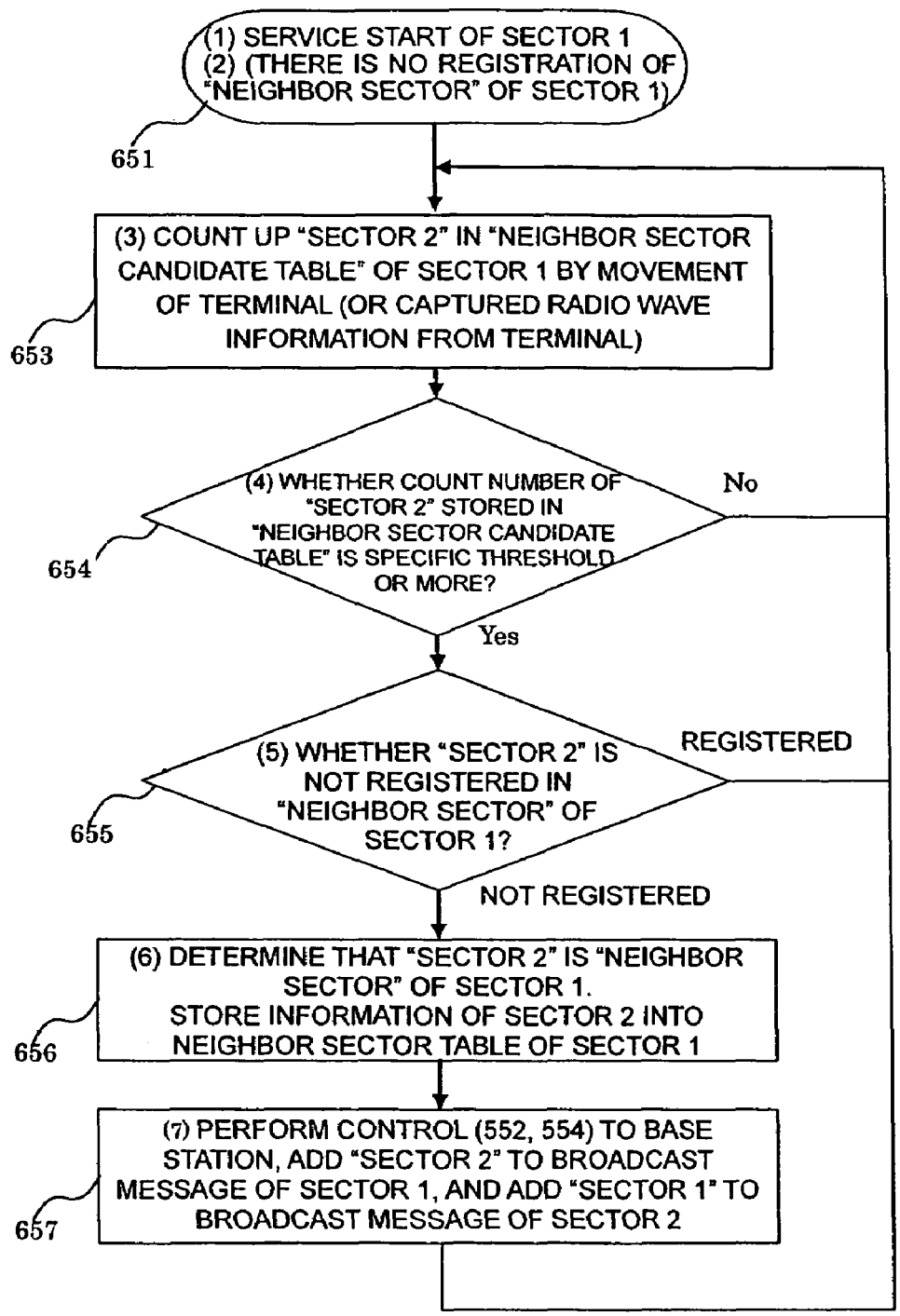
FIG. 10 is a flowchart for explaining an example of a control logic of an operation in which a neighbor sector is determined from neighbor sector candidates and a control is performed to a base station.

FIG. 10 is an operation flowchart of neighbor sector determination. Here, a description will be given to an example of a case where with respect to the sector 1, the sector 2 is the neighbor sector. Incidentally, also with respect to the other sectors, the same flowchart can be used.

Incidentally, at the time of service start of the sector 1, the "neighbor sector" is not registered in the neighbor sector table (201-3). The base station control part (201) counts up the count number of the "sector 2" in the neighbor sector candidate table (201-2) of the sector 1 as a result of the movement of the terminal (processing 653).

Figure 11:
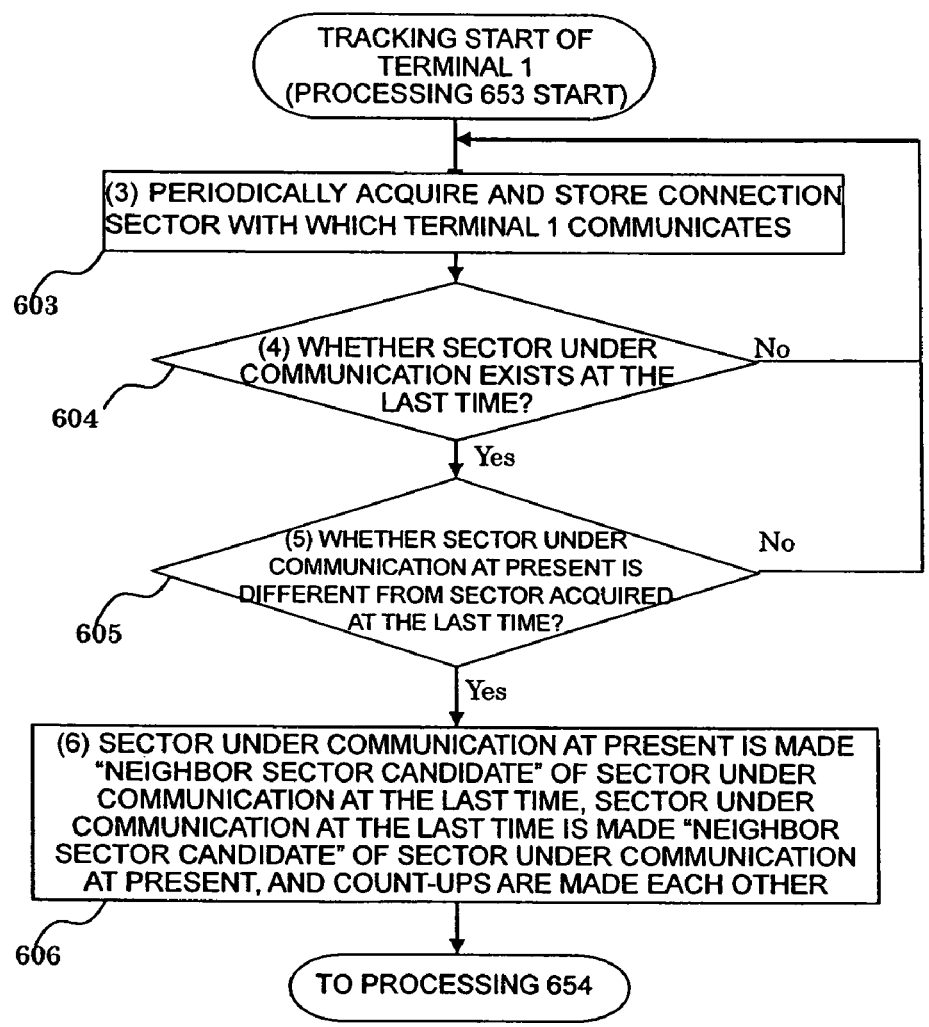
FIG. 11 is a flowchart for explaining an example of a control logic of an operation to obtain a candidate of a neighbor sector when a wireless terminal is moved in the first embodiment.

FIG. 11 is a flowchart showing a judgment logic to perform the count-up of the neighbor sector candidate table (201-2). The operation of processing 653 will be specifically described with reference to FIG. 11.

First, the base station control part (201) periodically acquires the connection sector with which the terminal 1 (501) communicates, the time and the terminal identifier, and stores the connection sector into the terminal connection history table (201-1) correspondingly to the acquired time and terminal identifier (processing 603: corresponding to the foregoing processing 509). Next, the base station control part (201) refers to the terminal connection history table (201-1), and judges whether a sector under communication exists at the last time (processing 604). For example, the base station control part (201) refers to the terminal connection history table (201-1), and when a connection sector is stored at a time one before the time stored at processing 603, it is judged that the sector under communication exists at the last time. On the other hand, when a connection sector is not stored, it is judged that the sector under communication does not exist at the last time.

In the case where the base station control part (201) judges that the sector under communication does not exist at the last time (processing 604: No), return is made to processing 603. On the other hand, in the case where the base station control part (201) judges that the sector under communication exists at the last time (processing 604: Yes), it is judged whether the sector under communication at present is different from the sector in which the terminal identifier is acquired at the last time (processing 605). For example, the base station control part (201) refers to the terminal connection history table (201-1), and with respect to the terminal 1, when the connection sector corresponding to the present time is coincident with the connection sector corresponding to the time one before, it is judged that the sector under communication at present is equal to the sector acquired at the last time. On the other hand, when those connection sectors are not coincident to each other, it can be judged that the sector under communication at present is different from the sector acquired at the last time. Incidentally, in this flowchart, although reference is made to the time one before, reference may be made to a time in a previously determined time range.

In the case where the base station control part (201) judges that the sector under communication at present is equal to the sector acquired at the last time (processing 605: No), return is made to processing 603. On the other hand, when the base station control part (201) judges that the sector under communication at present is different from the sector acquired at the last time (processing 605: Yes), the sector (for example, sector 2) under communication at present is made the "neighbor sector candidate" of the sector (for example, sector 1) under communication at the last time, and the sector under communication at the last time is made the "neighbor sector candidate" of the sector under communication at present, and the relevant count numbers of the respective neighbor sector candidate tables (201-2) are counted up. For example, with respect to the neighbor sector candidate table (201-2) of the sector 1, the count number corresponding to the sector 2 is increased, and with respect to the neighbor sector candidate table (201-2) of the sector 2, the count number corresponding to the sector 1 is increased.

Return is made to FIG. 10, and the base station control part (201) judges whether the count number of the "sector 2" stored in the neighbor sector candidate table (201-2) is a specific threshold or more (processing 654). In the case where the count number of the "sector 2" is smaller than the specific threshold (processing 654: No), the base station control part (201) returns to processing 653. On the other hand, in the case where the count number of the sector 2 is the specific threshold or more (654), the base station control part (201) refers to the neighbor sector table (201-3) of the sector 1, and judges whether the sector 2 is registered in the "neighbor sector" (processing 655). In the case where the sector 2 is registered in the "neighbor sector" of the neighbor sector table (201-3) of the sector 1 (processing 655), return is made to processing 653. On the other hand, in the case where the sector 2 is not registered in the "neighbor sector" of the neighbor sector table (201-3) (processing 655), the base station control part (201) determines that the sector 2 is the "neighbor sector" of the sector 1 (processing 656). Besides, the sector information of the sector 2 is stored in the neighbor sector table (201-3) of the sector 1.

Next, the base station control part (201) controls the base station (100), causes the "sector 2" to be added to the broadcast message (notification message) of the sector 1, and causes the "sector 1" to be added to the broadcast message (notification message) of the sector 2 (processing 657, corresponding to the foregoing processing 552, 554). The base station control part (201) returns to processing 653, and executes the processing subsequent to processing 653. Incidentally, in the above description, although the description has been given to the case where the sector 1 and the sector 2 are adjacent to each other, the same applies to a case where arbitrary sectors, such as the sector 1 and the sector 3, are adjacent to each other.

The terminal (501) receives the broadcast message including the neighbor sector information transmitted from the sector under communication, and attempts to capture a radio wave from another sector based on the neighbor sector information. For example, the terminal (501) captures a pilot signal in accordance with the pilot signal information and the frequency channel information included in the received neighbor sector information. As stated above, the neighbor sector information is automatically registered and updated, so that the terminal can efficiently capture the radio wave.

The above operation is repeatedly performed for plural terminals. With respect to each sector, the base station control part (201) records the partner sector which becomes the "neighbor sector candidate" and the number of times it becomes the candidate. In the example of the neighbor sector candidate table (201-2) of the sector 1 shown in FIG. 6, for example, the number of times the sector 2 becomes the candidate of the neighbor sector is 120.

Besides, the base station control part (201) can successively delete a connection history and a communication termination history of a terminal stored in the terminal connection history table (201-1) in the order in which a predetermined period has passed. In the case where the deleted history was used for the count of the "neighbor sector candidate", the count number of the "neighbor sector candidate" of the neighbor sector candidate table (201-2) is also decremented. For example, a flag to indicate that the history was used for the count of the "neighbor sector candidate" is provided, and in accordance with this flag, it may be judged whether the count number is to be decremented, and similarly to the foregoing count-up, it may be judged whether a sector is the neighbor sector candidate.

When the count number of the "neighbor sector candidate" becomes lower than a previously determined number of times, the base station control part (201) judges that the sector is not the "neighbor sector", and performs a control so that a delete instruction including suitable identifying information (for example, a sector identifier) for specifying the neighbor sector information judged not to be the neighbor sector is transmitted from the base station control part (201) to the base station (100). The base station (100) deletes the information of the base station (100) from the "neighbor sector information" in the broadcast message (notification message) in accordance with the delete instruction and performs broadcast message transmission.

The processing of deleting the neighbor sector information will be further described. For example, the base station control part (201) deletes selector identifiers stored in the connection history table (201-1) in order of the first one corresponding to a time when a previously determined period has passed. Next, when different selector identifiers are deleted in the previously determined time range, with respect to the neighbor sector candidate table (201-2) corresponding to one (first sector identifier) of the two different sector identifiers, the base station control part (201) decrements the count number corresponding to the other (second selector identifier) of the two different selector identifiers. Besides, when the count number of the neighbor sector candidate table (201-2) becomes lower than a predetermined threshold by the decrement, the base station control part (201) transmits a delete request to delete the neighbor sector information concerning the second sector identifier to the base station (100) corresponding to the first sector identifier. As stated above, the information concerning the second sector identifier is deleted from the neighbor sector information transmitted from the base station (100).

The adjacent relation of the base stations and the sectors is changed according to the increase and arrangement change of base stations, the construction of a peripheral building and the like. Accordingly, even if the number of times a sector is made the neighbor sector candidate has exceeded the threshold, there is a case where the sector comes not to be the neighbor sector by the increase of base stations or the like. In this embodiment, the counted number of times a sector is made the neighbor sector candidate is decremented after the specified time has passed, so that it is possible for the neighbor sector candidate to include only information close to the present time.

By the above processing, after the service start of a sector, the neighbor sector candidate is counted up and the neighbor sector is determined, and when the specified time has passed, the count-up and count-down of the neighbor sector candidate is performed.

(1) With respect to the neighbor sector, since it is supposed that the reception of a different sector identifier as the trigger of the count-up and the deletion of a different sector identifier as the trigger of the count-down becomes almost equal to each other in number, when the count number has exceeded the threshold, the sector is continuously regarded as the neighbor sector.

(2) On the other hand, in the case where although a sector has been a neighbor sector until now, it comes not to be the neighbor sector by the increase of base stations or the like, the sector identifier corresponding to the neighbor sector candidate as the trigger of the count-up is not received in a continuous time, and the sector identifier as the trigger of the count-down is deleted, and therefore, the count number gradually becomes lower than the threshold, and the sector is deleted from the neighbor sector.

(3) Besides, in the case where although a sector has not been a neighbor sector until now, it becomes the neighbor sector by the increase of base stations or the like, similarly to the sector service start, the neighbor sector candidate is counted up and the neighbor sector is determined, and when the specified time has passed, the count-up and count-down of the neighbor sector candidate is performed.

2. Second Embodiment (Hard Structure)

Hereinafter, a structure of a wireless base station and a mobile communication network in a second embodiment will be described with reference to the drawings. In the second embodiment, a terminal collects information concerning a radio wave to be captured from a sector and determines a neighbor sector.

Figure 12:
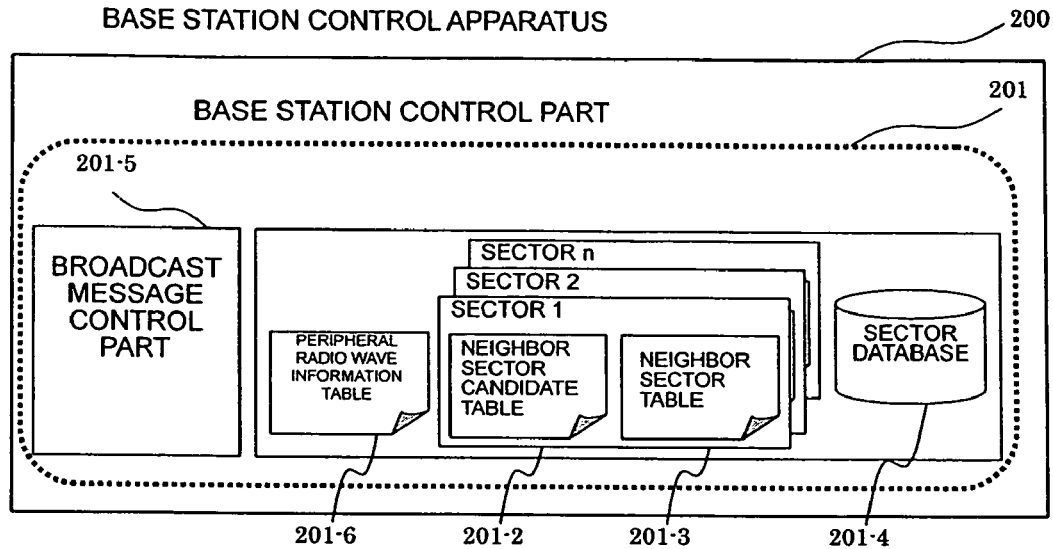
FIG. 12 is a block diagram showing a structure of a mobile communication network in a second embodiment.
Figure 12:
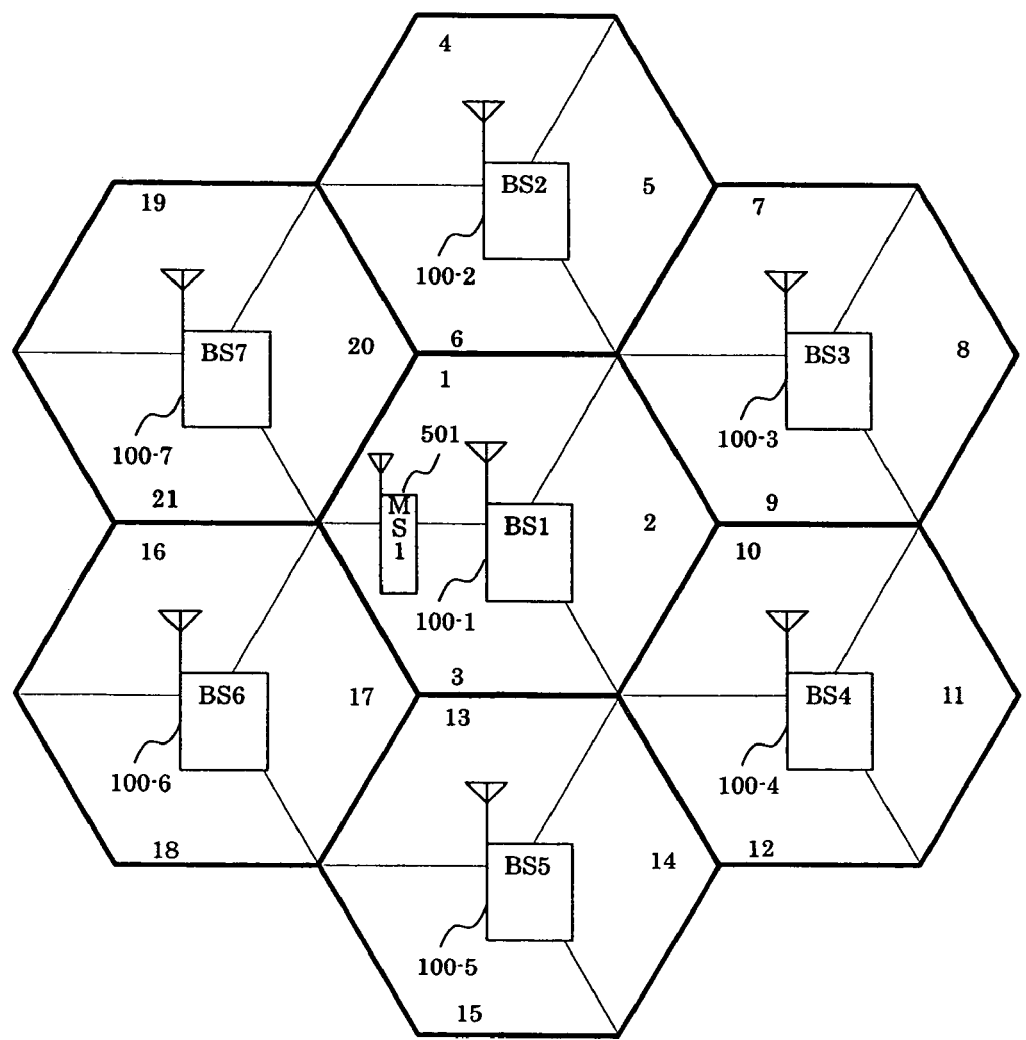

FIG. 12 is a block diagram showing a structural example of a mobile communication system to which this embodiment is applied. Similarly to the first embodiment, the mobile communication system includes wireless base stations (100-1 to 100-7), plural wireless terminals (501), and a base station control apparatus (200) to control the wireless base stations (100). Since the structures of the wireless base station (100) and the wireless terminal (501) are similar to the first embodiment, the description will be omitted. A base station control part (201) as a program operating in the base station control apparatus (200) includes a peripheral radio wave information table (201-6) instead of the terminal connection history table of the first embodiment. The other structure is the same as the first embodiment. Incidentally, it does not matter that the base station control part (201) exists in which housing of the base station (100) and the mobile communication network. FIG. 12 shows an example of the case where the base station control part (201) is contained in the dedicated base station control apparatus (200). By the above, the wireless base station (100) to perform the cdma communication and the mobile communication network are constructed. At the stage where the network is constructed, "neighbor sector information" of each sector may not be registered.

(Table Structure)

FIG. 13 is an explanatory view for explaining a state of the peripheral radio wave information table (201-6).

The peripheral radio wave information table (201-6) stores message content which each terminal notifies to the base station (100) as the communication partner. The peripheral radio wave information table (201-6) stores, for each call identifying information and correspondingly to a time, captured radio wave information indicating a captured radio wave captured by the terminal at the time, and a sector identifier of a sector corresponding to the captured radio wave. For example, the example of FIG. 13 indicates that a terminal communicating in a call 1 captures radio waves A and B at 13:01. Besides, A and B denote radio waves from sectors 1 and 2, and identifying informations of the sectors 1 and 2 are stored in the column of the sector.

(Operation)

Hereinafter, a description will be given to an example of an operation in which a neighbor sector is automatically determined by a notification message from a terminal.

Figure 14:
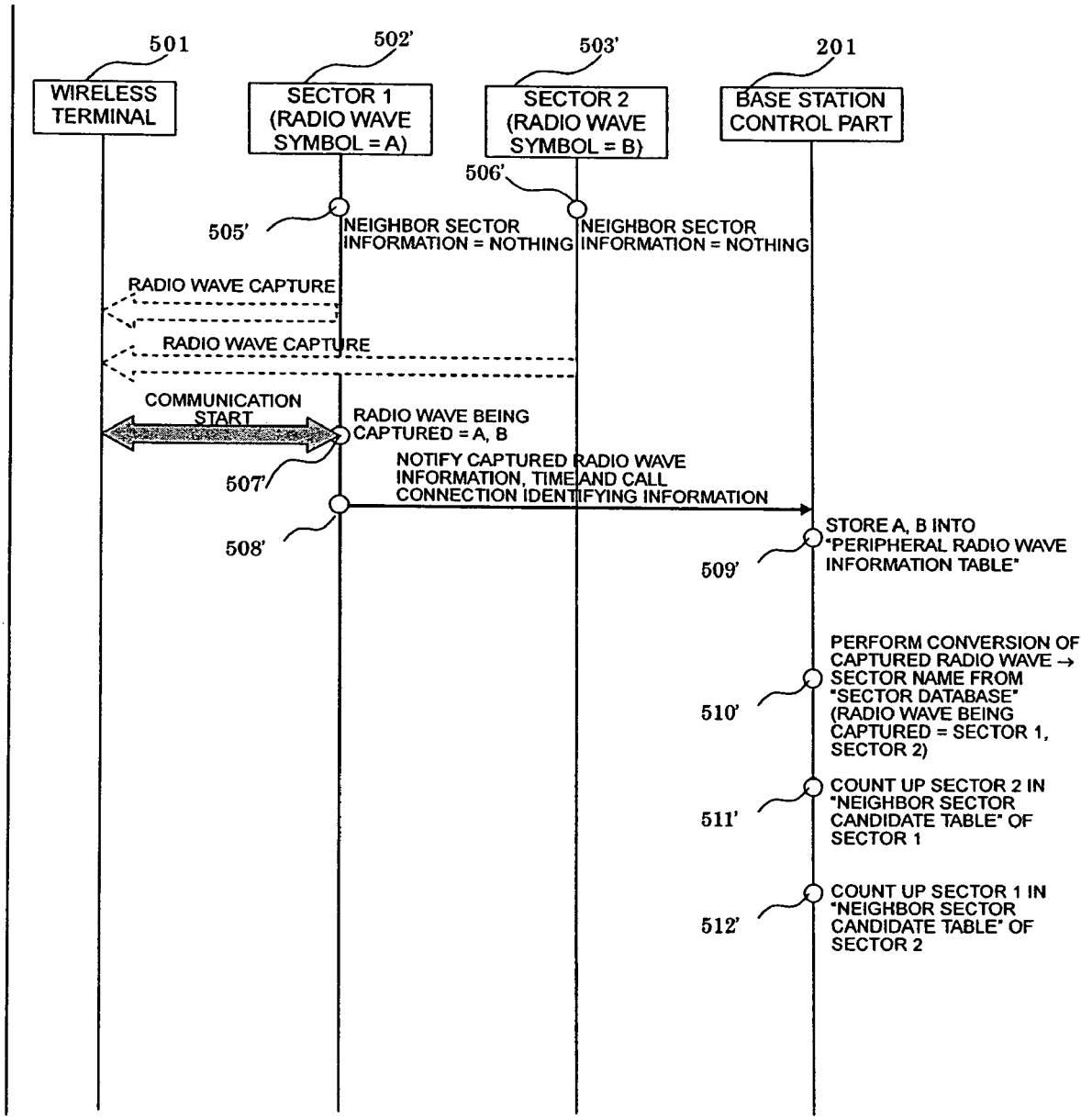
FIG. 14 is an operation explanatory view for explaining an example of an operation to find a candidate of a neighbor sector by a radio wave captured by a wireless terminal in the second embodiment.

FIG. 14 shows a sequence of count-up of an adjacent candidate by a captured radio wave of a terminal. FIG. 14 shows an operation in a state where the wireless terminal (501)

captures radio waves of both a sector 1 (502') and a sector 2 (503'). Since neighbor sector information is not set in a broadcast message of each sector (505' and 506'), unless the terminal itself can receive a radio wave of a peripheral base station (100) by searching a pilot signal of the peripheral base station, the soft handover can not be performed.

It is assumed that the terminal succeeds in receiving radio waves from plural sectors, for example, a signal A and a signal B by the search processing for the pilot signal of the peripheral base station (100) performed by the terminal itself. Incidentally, in this example, a radio wave symbol of the sector 1 is A and a radio wave symbol of the sector 2 is B. When the wireless terminal (501) starts to communicate with the base station (100), the terminal (501) notifies information (captured radio wave information) of a signal being captured to the base station (100) including a sector under communication (processing 507'). Here, for example, the signal A and the signal B are notified to the base station (100) corresponding to the sector 1.

The base station (100) periodically notifies the captured radio wave information received from the terminal (501), the time and the call identifying information to the base station control part (201) (processing 508'). As the call identifying information, suitable numerals, characters, symbols and the like to identify the call between the terminal and the sector 1 can be used and can be previously stored in a suitable memory. The base station control part (201) stores the information notified from the base station (100) into the peripheral radio wave information table (201-6) (processing 509'). For example, the base station control part (201) stores the captured radio wave information into a field of the peripheral radio wave information table (201-6) corresponding to the notified time and the call identifying information. Besides, the base station control part (201) retrieves the pilot signal of the sector database (201-4) based on the captured radio wave information, and acquires the sector identifier corresponding to the pilot signal coincident with the captured radio wave information (processing 510'). The base station control part (201) stores the acquired sector identifier into a field of the peripheral radio wave information table (201-6) corresponding to the notified time and the call identifying information. Incidentally, the notification of the time from the base station (100) is omitted, and the time when the base station control part (201) receives the captured radio wave information may be used.

The base station control part (201) refers to the peripheral radio wave information table (201-6), and in the case where the terminal captures plural radio waves simultaneously (in the case where plural pieces of captured radio wave information are stored in the field of the same time and the same call identifying information), these are regarded as "neighbor sector candidates". With respect to the sectors regarded as the "neighbor sector candidates", the base station control part (201) counts the number of times they become candidates in the neighbor sector candidate table (201-2) (processing 511', 512'). For example, in the neighbor sector candidate table (201-2) of the sector 1, the count number corresponding to the sector 2 is counted up. Besides, in the neighbor sector candidate table (201-2) of the sector 2, the count number corresponding to the sector 1 is counted up.

Thereafter, processings 550 to 556 are executed. Incidentally, since the processings 550 to 556 are similar to the first embodiment, the description is omitted.

Figure 15:
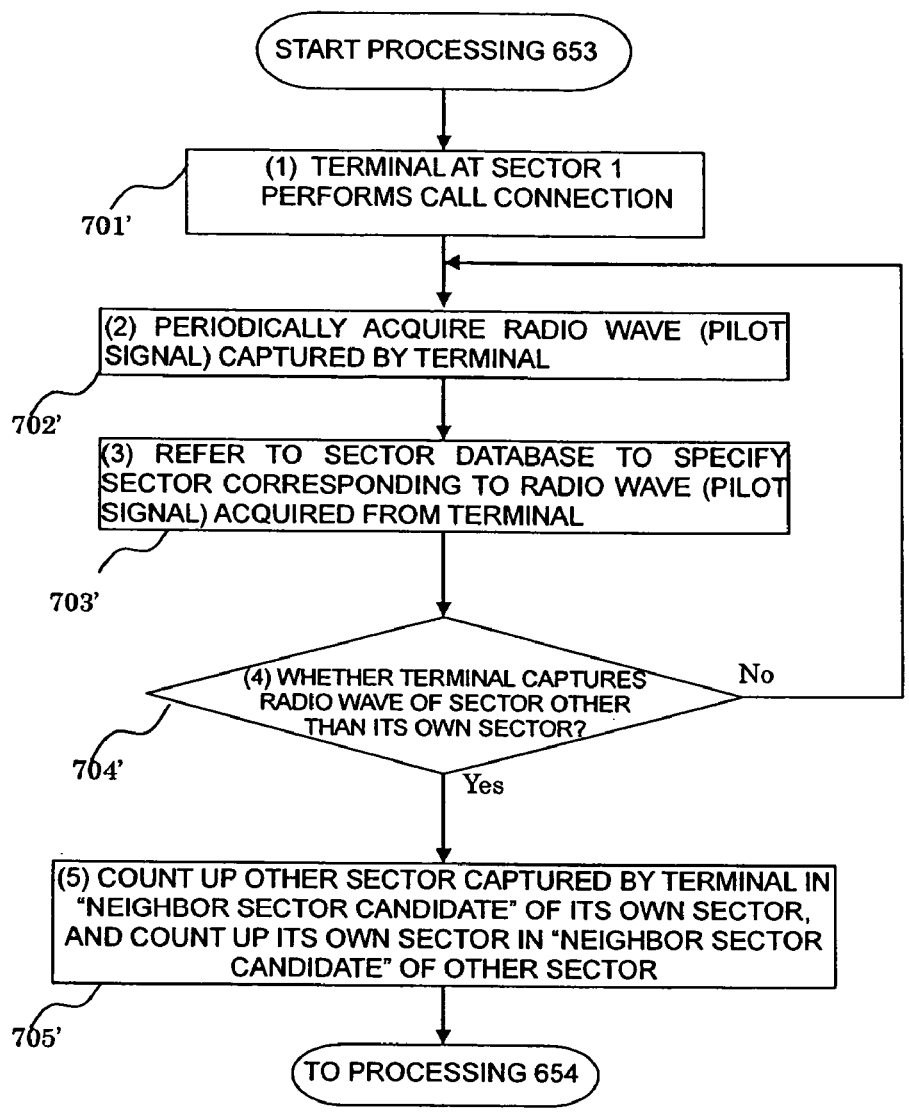
FIG. 15 is a flowchart for explaining an example of a control logic of the operation to obtain the candidate of the neighbor sector by the radio wave captured by the wireless terminal in the second embodiment.

FIG. 15 is a flowchart showing a judgment logic to perform the count-up of the neighbor sector candidate table (201-2). The flow (for example, processing 651, 654 to 657) of the neighbor sector determination is similar to the first embodiment (for example, FIG. 10, etc.). Here, the operation of processing 653 in the second embodiment will be specifically described with reference to FIG. 15.

First, the terminal (501) located in the sector 1 performs call connection through the sector 1 (processing 701'). Incidentally, in the case where the call is already connected, this can be omitted. The base station control part (201) periodically acquires, from the terminal (501), the captured radio wave information concerning the radio wave (pilot signal) captured by the terminal (501) (processing 702'). Besides, the base station control part (201) stores the acquired captured radio wave information into the peripheral radio wave information table (201-6) correspondingly to the call identifying information acquired from the terminal and the time.

The base station control part (201) refers to the sector database (201-4), and acquires the sector identifier corresponding to the captured radio wave information acquired from the terminal (processing 703'). Besides, the base station control part (201) stores the acquired sector identifier into the peripheral radio wave information table (201-6) correspondingly to the call identification information acquired from the terminal and the time. The base station control part (201) judges whether the terminal captures a radio wave of a sector other than its own sector (sector under communication) (processing 704'). For example, the base station control part (201) refers to the captured radio wave information of the peripheral radio wave information table (201-6), and can judge that the terminal captures a radio wave of a sector other than its own sector when plural pieces of captured radio wave information are stored at the same time and in the same call identifying information. In the case where the terminal does not capture the radio wave of the sector other than its own sector (processing 704': No), the base station control part (201) returns to processing 702'. On the other hand, in the case where the terminal captures the radio wave of the sector other than its own sector (processing 704': Yes), the base station control part (201) regards the other sector captured by the terminal as the neighbor sector candidate of its own sector, and regards its own sector as the neighbor sector candidate of the other sector, and the count-up is performed (processing 705'). For example, at 13:01 of the example of FIG. 13, the sector 1 and the sector 2 are stored as the sector identifiers, and the base station control part (201) regards the sector 2 as the neighbor sector candidate of the sector 1 and counts up the count number corresponding to the sector 2 in the neighbor sector candidate table (201-2) of the sector 1. Besides, the base station control part (201) regards the sector 1 as the neighbor sector candidate of the sector 2 and counts up the count number corresponding to the sector 1 in the neighbor sector candidate table (201-2) of the sector 2. Thereafter, advance is made to processing 654.

FIG. 13 shows an example of the state of the peripheral radio wave information table (201-6). In the call 1 connected at time 13:01, the radio waves A and B are simultaneously captured. The base station control part (201) holds the sector information of each base station like the example of the state of the sector database (201-4) shown in FIG. 5. The base station control part (201) refers to the sector database (201-4) to find that the captured radio wave information stored in the peripheral radio wave information table (201-6) corresponds to the radio wave of which sector of which base station (100). For example, the pilot signal of the sector database (201-4) is retrieved based on the captured radio wave information, and the sector corresponding to the pilot signal is acquired. In the example of FIG. 13, it is found that the sectors corresponding to the radio waves A and B captured by the terminal connected at the time of 13:01 are the sector 1 and the sector 2. The base station control part (201) regards the obtained sector pair as the "neighbor sector candidates", and counts up the corresponding count number of the neighbor sector candidate table (201-2) similarly to the first embodiment. That is, the sector 1 and the sector 2 are recorded as the "neighbor sector candidates".

The foregoing operation is repeatedly performed for plural terminals. For each sector, the base station control part (201) records the partner sector of the "neighbor sector candidates" and the number of times it becomes the candidate.

Besides, the base station control part (201) can delete the captured radio wave information stored in the peripheral radio wave information table (201-6) in the order in which a specified period has passed. In the case where the deleted history has been used for the count of the "neighbor sector candidate", the count number of the "neighbor sector candidate" is also decreased. For example, a flag to indicate that a history has been used for the count of the "neighbor sector candidate" is provided, and it may be discriminated whether the count number is decremented or not in accordance with this flag, or similarly to the foregoing count-up, a judgment as to the neighbor sector candidate may be made.

When the count number of the "neighbor sector candidate" becomes lower than a previously determined number of times, it is judged that the sector is not the "neighbor sector", a control is performed so that a delete instruction is sent to the base station (100) from the base station control part (201), the information of the base station (100) is deleted from the "neighbor sector information" in the notification message, and broadcast message transmission is performed.

The processing to delete the neighbor sector information will be further described. For example, the base station control part (201) deletes sector identifiers stored in the peripheral radio wave information table (201-6) in order of the first one corresponding to a time when a previously determined period has passed. Next, when different sector identifiers are deleted in a previously determined time range, with respect to the neighbor sector candidate table (201-2) corresponding to one (first sector identifier) of the two different sector identifiers, the base station control part (201) decrements the count number corresponding to the other (second sector identifier) of the two different sector identifiers. When the count number of the neighbor sector candidate table (201-2) becomes lower than the previously determined threshold by the decrement, the base station control part (201) transmits the delete request to delete the neighbor sector information concerning the second sector identifier to the base station (100) corresponding to the first sector identifier. By this, the information of the second sector identifier is deleted from the neighbor sector information to be transmitted from the base station (100).

The invention can be used for the industry relating to mobile communication in which for example, plural wireless terminals simultaneously communicate with one sector, and one wireless terminal can receive signals of plural sectors. Besides, the invention can be used for the industry relating to mobile communication in which communication is performed by the code division multiple access (CDMA) system in each base station sector.

According to the invention, a mobile communication system, a mobile communication apparatus, and a mobile communication method can be provided in which in the mobile communication network of the cdma system, a wireless terminal can effectively perform soft handover between sectors of respective base stations. Besides, according to the invention, even in the case where neighbor sector information is not registered, the neighbor sector information is automatically collected and set, and the soft handover of the wireless terminal can be effectively performed. Further, the invention can provide a mobile communication system which can reduce the operation cost by omitting radio wave measurement, simulation, setting operation and the like at the time of additional installation of a base station, removal thereof, movement thereof, change of transmission environment or the like.

Besides, according to the invention, at the time of the arrangement change of base stations, the change of radio wave environment by the change of peripheral environment, new installation of a base station or the like, it is possible to automatically update a broadcast message to effectively perform the soft handover without performing maintenance actions such as simulation, radio wave measurement, and change of base station parameters.

What is claimed is:

1. A wireless communication system comprising:
   one or plural base stations each of which has one or plural sectors and transmits neighbor sector information including, for each sector, a sector identifier of another sector adjacent to the sector and/or information to identify a radio wave from the another sector, to a wireless terminal for each sector; and
   a base station control part which includes a connection history table storing, for each terminal identifier of the wireless terminal and correspondingly to a time, a sector identifier of a sector with which the wireless terminal communicates, and is for changing the neighbor sector information transmitted from the base station, wherein
   the base station transmits the terminal identifier acquired from the wireless terminal and the sector identifier of the sector communicating with the wireless terminal to the base station control part,
   the base station control part receives the terminal identifier and the sector identifier, and stores the sector identifier into the connection history table correspondingly to the terminal identifier and a reception time,
   the base station control part refers to the connection history table, judges that in a case where plural different sector identifiers are stored correspondingly to each terminal identifier in a previously determined time period from an arbitrary time, a first sector and a second sector among the plural different sector identifiers are neighbor sector candidates, and counts the number of times they are judged to be the neighbor sector candidates correspondingly to a first sector identifier of the first sector and a second sector identifier of the second sector, and
   the base station control part transmits, with respect to the first and the second sector identifiers in which the counted number of times is a previously determined threshold or more, a change request, which includes the second sector identifier and/or information to identify a radio wave from the second sector and is for changing the neighbor sector information from the base station, to the base station corresponding to the first identifier.

2. The wireless communication system according to claim 1, wherein
   the base station control part further includes a sector database in which one or plural of pilot signal information and frequency channel information are stored correspondingly to the sector identifiers,
   the base station control part refers to the sector database based on the second sector identifier with respect to the first and the second sector identifiers in which the counted number of times is the previously determined threshold or more, and acquires one or plural of corresponding pilot signal information and frequency channel information, and the base station control part transmits a change request, which includes one or plural of the second sector identifier, the acquired pilot signal information and the frequency channel information and is for changing the neighbor sector information from the base station, to the base station corresponding to the first sector identifier.

3. The wireless communication system according to claim 1, wherein the base station control part further includes a neighbor sector candidate table in which for each sector, a sector identifier of a neighbor sector candidate of the sector and a count number for counting the number of times of judgment of the neighbor sector candidate are stored correspondingly, the base station control part counts the number of times by increasing a count number corresponding to the second sector identifier with respect to the neighbor sector candidate table corresponding to the first sector, and the base station control part refers to the neighbor sector candidate table of each sector to acquire a sector identifier in which a count number is a previously determined threshold or more, and transmits a change request, which includes one or plural of the acquired sector identifier, pilot signal information and frequency information corresponding to the sector identifier and is for changing the neighbor sector information from the base station, to the base station of the sector corresponding to the neighbor sector candidate table.

4. The wireless communication system according to claim 3, wherein the base station control part deletes sector identifiers stored in the connection history table in order of the first one corresponding to a time when a previously determined period has passed, when plural different sector identifiers are deleted in a previously determined time width, the base station control part decrements a count number corresponding to a fourth sector identifier among the plural different sector identifiers in the neighbor sector candidate table according to a third sector identifier among the plural different sector identifiers, and when the count number in the neighbor sector candidate table becomes lower than a previously determined threshold by the decrement, the base station control part transmits a delete request to delete information concerning the fourth sector identifier from the neighbor sector information to the base station corresponding to the third sector identifier.

5. A wireless communication system comprising:

one or plural base stations each of which has one or plural sectors and transmits neighbor sector information including, for each sector, a sector identifier of another sector adjacent to the sector and/or information to identify a radio wave from the another sector; and a base station control part to change the neighbor sector information transmitted from the base station, wherein the base station acquires, from a wireless terminal, one or plurality of captured radio wave information indicating radio waves captured from one or plural sectors by the wireless terminal and transmits the captured radio wave information to the base station control part, the base station control part receives the captured radio wave information from the base station, judges whether plurality of captured radio wave information are received, judges that a first sector and a second sector are neighbor sector candidates among plural sector identifiers each of which corresponds to the plurality of captured radio wave information, and counts the number of times they are judged to be the neighbor sector candidates correspondingly to a first sector identifier of the first sector and a second sector identifier of the second sector, and the base station control part transmits, with respect to the first and the second sector identifiers in which the counted number of times is a previously determined threshold or more, a change request, which includes the second sector identifier and/or information to identify a radio wave from the second sector and is for changing the neighbor sector information from the base station, to the base station corresponding to the first identifier.

6. The wireless communication system according to claim 5, wherein the base station control part includes a peripheral radio wave information table in which captured radio wave information concerning the radio wave captured by the wireless terminal from the sector and a sector identifier corresponding to the captured radio wave information are stored for each call identifier to identify a call of the wireless terminal and correspondingly to a time, the base station further transmits the call identifier to the base station control part, the base station control part receives the call identifier and the captured radio wave information, and stores the captured radio wave information into the peripheral radio wave information table correspondingly to the call identifier and a reception time, and the base station control part refers to the peripheral radio wave information table, and judges that plurality of captured radio wave information are received when the plurality of captured radio wave information are stored at the same reception time with respect to each call identifier.

7. The wireless communication system according to claim 5, wherein the base station control part further includes a sector database in which one or plural of pilot signal information and frequency channel information are stored correspondingly to a sector identifier, the base station control part refers to the pilot signal information of the sector database based on each piece of the received captured radio wave information to acquire a corresponding sector identifier, and counts the number of times of judgment of neighbor sector candidates correspondingly to the first and the second sector identifiers among the acquired sector identifiers, the base station control part refers to the sector database based on the second sector identifier with respect to the first and the second neighbor sector identifiers in which the counted number of times is a previously determined threshold or more, and acquires one or plural of the corresponding pilot signal information and frequency channel information, and the base station control part transmits a change request, which includes one or plural of the second sector identifier, the pilot signal information and the frequency channel information and is for changing the neighbor sector information from the base station, to the base station corresponding to the first sector identifier.

8. The wireless communication system according to claim 5, wherein the base station control part further includes a neighbor sector candidate table in which for each sector, a sector identifier of a neighbor sector candidate of the sector and a count number for counting the number of times of judgment of the neighbor sector candidate are stored, the base station control part counts the number of times by increasing the count number correspondingly to another sector identifier corresponding to the second sector identifier and/or the captured radio wave information with respect to the neighbor sector candidate table corresponding to the first sector, and the base station control part refers to the neighbor sector candidate table of each sector to acquire a sector identifier in which the count number is a previously determined threshold or more, and transmits a change request, which includes one or plural of the acquired sector identifier, pilot signal information and frequency information corresponding to the sector identifier and is for changing the neighbor sector information from the base station, to the base station of the sector corresponding to the neighbor sector candidate table.

9. The wireless communication system according to claim 8, wherein the base station control part deletes sector identifiers stored in the peripheral radio wave information table in order of the first one corresponding to a time when a previously determined period has passed, when plural different sector identifiers are deleted in a previously determined time width, the base station control part decrements the count number corresponding to a fourth sector identifier among the plural different sector identifiers in the neighbor sector candidate table of a third sector identifier among the plural different sector identifiers, and when the count number in the neighbor sector candidate table becomes lower than a previously determined threshold by the decrement, the base station control part transmits a delete request to delete information concerning the fourth sector identifier from the neighbor sector information to the base station corresponding to the third sector identifier.

10. A wireless base station control apparatus comprising:

an interface to transmit/receive information to/from a base station having one or plural sectors;

a connection history table in which a sector identifier of a sector with which a wireless terminal communicates is stored for each terminal identifier of the wireless terminal and correspondingly to a time; and a processing part to change neighbor sector information which is transmitted from the base station having one or plural sectors to the wireless terminal and includes, for each sector, a sector identifier of another sector adjacent to the sector and/or information to identify a radio wave from the another sector, wherein the processing part receives, from the base station, a terminal identifier from the wireless terminal and a sector identifier of a sector communicating with the wireless terminal, the processing part stores the sector identifier into the connection history table correspondingly to the terminal identifier and a reception time, the processing part refers to the connection history table, judges that in a case where plural different sector identifiers are stored correspondingly to each terminal identifier in a previously determined time period from an arbitrary time, a first sector and a second sector among the plural different sector identifiers are neighbor sector candidates, and counts the number of times they are judged to be the neighbor sector candidates correspondingly to a first sector identifier of the first sector and a second sector identifier of the second sector, and the processing part transmits, with respect to the first and the second sector identifiers in which the counted number of times is a previously determined threshold or more, a change request, which includes the second sector identifier and/or information to identify a radio wave from the second sector and is for changing the neighbor sector information from the base station, to the base station corresponding to the first identifier.

11. A wireless base station control apparatus comprising:

an interface to transmit/receive information to/from a base station having one or plural sectors; and a processing part to change neighbor sector information which is transmitted from the base station to a wireless terminal and includes, for each sector, a sector identifier of another sector adjacent to the sector and/or information to identify a radio wave from the another sector, wherein the processing part receives, from the base station, one or plurality of captured radio wave information indicating radio waves captured by the wireless terminal from one or plural sectors, judges whether plurality of captured radio wave information are received, judges that a first sector and a second sector among plural sector identifiers corresponding to the plurality of captured radio wave information are neighbor sector candidates, and counts the number of times they are judged to be the neighbor sector candidates correspondingly to a first sector identifier of the first sector and a second sector identifier of the second sector, and the processing part transmits, with respect to the first and the second sector identifiers in which the counted number of times is a previously determined threshold or more, a change request, which includes the second sector identifier and/or information to identify a radio wave from the second sector and is for changing the neighbor sector information from the base station, to the base station corresponding to the first sector identifier.

* * * * *